[19] United States Patent
Bärtschi

[11] 4,179,701
[45] Dec. 18, 1979

[54] DEVICE FOR ELECTROMECHANICALLY POSITIONING A UNILATERALLY PIVOTED LEVER ARM IN THREE DIFFERENT STABLE POSITIONS

[75] Inventor: Jean-Jacques Bärtschi, Bern, Switzerland

[73] Assignee: Hasler AG, Bern, Switzerland

[21] Appl. No.: 905,743

[22] Filed: May 15, 1978

[30] Foreign Application Priority Data

May 13, 1977 [CH] Switzerland ............... 6011/77

[51] Int. Cl.² ............... G01D 9/28; G01D 15/16
[52] U.S. Cl. ............... 346/62; 346/139 R
[58] Field of Search ............... 346/62, 139 R

[56] References Cited
U.S. PATENT DOCUMENTS

| 3,163,490 | 12/1964 | Thompson | 346/62 X |
| 3,394,382 | 7/1968 | Fuller | 346/139 R X |
| 4,015,270 | 3/1977 | Barnes, Jr. et al. | 346/139 R |

Primary Examiner—George H. Miller, Jr.
Attorney, Agent, or Firm—Brady, O'Boyle & Gates

[57] ABSTRACT

A lever arm adapted to hold a stylus or the like on one end is rigidly connected at the opposite end in spaced parallel relation to a second arm, and a shaft perpendicular to both arms through the rigid connection provides a pivot axis therefore. An opening in each arm in registered relation, at equal distances from the shaft, receive tabs on opposite edges of a plate-shaped pivoting armature which suspend it between the two arms and position it in a diagonal neutral position in a gap between two axially opposed, individually switched solenoids, each having a contact area and diagonally opposing abutments for contacting the armature biased against them in neutral position by at least one spring, whereby actuation of the solenoids moves the arms to three different stable positions.

6 Claims, 3 Drawing Figures

DEVICE FOR ELECTROMECHANICALLY POSITIONING A UNILATERALLY PIVOTED LEVER ARM IN THREE DIFFERENT STABLE POSITIONS

BACKGROUND OF THE INVENTION

The invention pertains to a device for positioning a unilaterally pivoted lever arm in three different stable positions with two solenoids.

Whereas positioning in two stable positions does not present any problems, there is a lack of electromechanical devices which in a simple manner are capable of positioning an element in three different stable positions. Among other applications, such devices are used in recording instruments with several recording traces in which one writing utensil must record several parameters.

In Hasler Review 7 (1974), No. 1, pages 7-23, E. Winkler describes "a new electronic speed and distance measuring system for railways". This article illustrates a strip recording which apart from the main recording shows several additional recordings. A separate writing utensil is used to obtain sets of two additional recordings. Each of these writing utensils possesses two accurately defined deflections, each of which is allocated to a function to be monitored.

German patent document No. 213 317 deals with a recording unit in which one pen arm can be positioned in either of two deflections with two solenoids. The central rest position when the solenoids are switched off is obtained with two springs whose opposing forces are exerted on the arm.

The writing utensil is therefore capable of drawing an additional trace in accordance with the above-mentioned literature passage. However, the device is designed in such a manner that the springs must possess identical characteristics and forces to adjust the central rest position. In general, this requires an adjustment device.

The purpose of this invention was to obtain an improved device for positioning a unilaterally pivoted lever arm in three different stable positions with two solenoids. One application of such a lever arm shall be used to carry a writing utensil in a compact strip recorder which will record closely adjacent a main function and several auxiliary functions.

SUMMARY OF THE INVENTION

The apparatus according to the invention has a lever arm rigidly connected in a forked fashion to a second arm disposed parallel thereto, a pivot shaft extends perpendicular to the two arms through the fork connection portion, each of the arms is provided with an opening at equal distances from the pivot shaft and a plate-shaped pivoting armature is suspended between the two arms by tabs on opposite edges of the armature that extend into the openings. The armature is positioned in a gap between two axially opposed, individually switched solenoids, each having a contact area and diagonally opposing abutments for the pivoting armature, and at least one spring is connected to normally bias the pivoting armature against the two abutments in such a manner that in the neutral position of the apparatus the pivoting armature is at rest positioned diagonally in the gap between the two solenoids.

BRIEF DESCRIPTION OF THE DRAWING

The invention is explained in greater detail by reference to the three drawings in which.

DESCRIPTION OF THE PREFERRED EMBODIMENT

Figure 1:
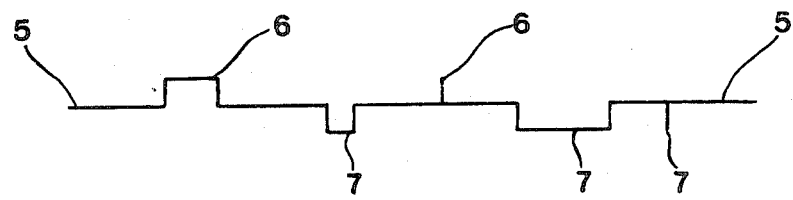
FIG. 1 is a diagram of a recording example of an auxiliary function.

FIG. 1 shows a typical auxiliary recording. The writing utensil constantly contacts the moving recording medium. In the neutral position, the writing utensil draws a central line 5. When the recording device is actuated, the pen arm is deflected to one of the two stable positions to produce deflections 6 or 7.

Figure 2:
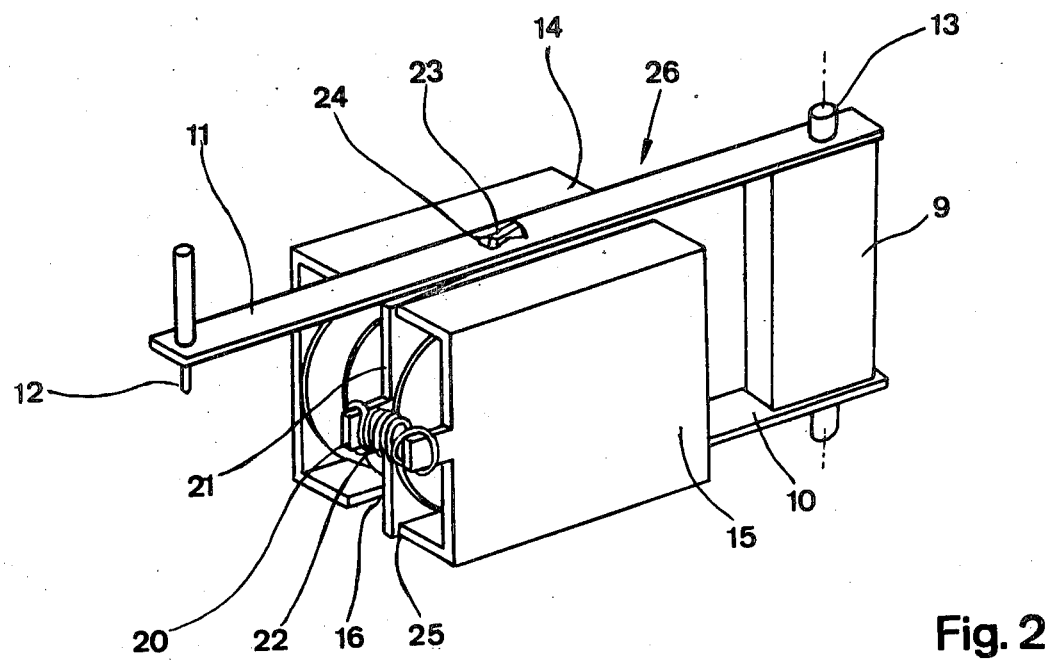
FIG. 2 is a perspective view of the recording unit of the invention.

FIG. 2 shows a perspective view of the recording device. 11 designates a pen arm whose end carries a spring-loaded writing utensil 12. The pen arm 11 is rigidly connected to a shorter guide arm 10 via block 9 in such a manner that the two arms are arranged in a parallel fork-shaped configuration. The arms are pivoted with shaft 13 in the bore of block 9 perpendicular to arms 10 and 11.

Pen arm 11 possesses an opening 24 in its center which corresponds to a similar opening in guide arm 10. The two openings 24 are bearings for a plate-shaped pivoting armature 21 which is pivoted in the bearing openings 24 with two tabs 23.

The actuating device used to deflect the pen arm 11 consists of pivoting armature 21 and of two solenoids 14 and 15. These two solenoids, each of which are composed of a coil and an E-shaped core are axially opposed and separated by a gap 16. The fork-shaped pen arm assembly is positioned with respect to gap 16 in such a manner that pivoting armature 21 is centered in gap 16 and shaft 13 lies outside the gap in the main symmetry plane of gap 16.

The two free edges of pivoting armature 21 each possess a hook-shaped stub 20, each of which is connected to a spiral spring 22. The other ends of the spiral springs are connected to the corresponding stubs of solenoids 14 and 15. In this configuration, the two spiral springs 22 can exert tensile forces on pivoting armature 21, drawing the armature to the diagonally opposed edges 25 or 26 of magnets 15 and 14. When the solenoids are not actuated, the pivoting armature will assume a diagonal position in the gap between the two solenoids.

In the preferred version, the tabs 23 are located in the middle of the upper and lower edges of pivoting armature 21. If this pivoting armature is therefore positioned diagonally in the gap between solenoids 14 and 15, the tabs 23 will therefore lie exactly over or under the middle of the gap. Since the two tabs pivot in openings 24 of the two arms 10 and 11, the pen arm 11 will assume a central position with respect to gap 16.

If one of the solenoids 14 or 15 is actuated, the pivoting armature will be pulled against the surface of the respective solenoid limiting the gap, thus deflecting the pen arm in one or the other deflection position.

Figure 3:
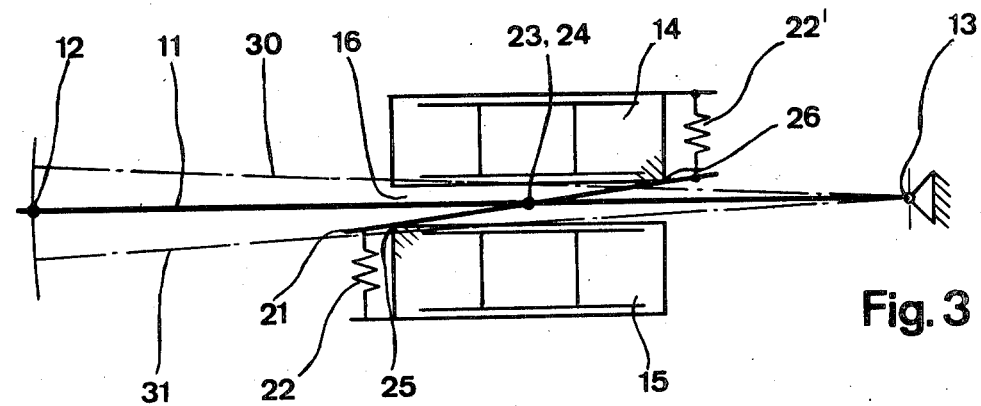
FIG. 3 is a schematic illustration of the recording unit viewed from the top.

For explanatory purposes, FIG. 3 shows the recording device in a simplified top view. 11 designates the pen arm whose free end carries writing utensil 12. The pen arm pivots around shaft 13. 14 and 15 again designate the deflection solenoids which are axially arranged and enclose gap 16. When neither of the solenoids is actuated, the springs 22 and 22' hold the pivoting armature in such a manner that it is diagonally positioned in gap 16 between solenoids 14 and 15. Stability is achieved by the fact that pivoting armature 21 contacts the diagonally opposed edges 25 and 26 of solenoids 15 and 14. Thus, the center of the pivoting armature where tabs 23 are located will lie in the center of the gap. Accurate guidance between tabs 23 and openings 24 of pen arm 11 and of guide arm 10 provided, this will result in an unambiguously defined neutral position for writing utensil 12.

If solenoid 14 is excited, pivoting armature 21 will be attracted by this solenoid and pen arm 11 will assume deflected position 30 indicated by a dash line. Due to the location of shaft 13 and the restraint points of pivoting armature 21, the deflection of writing utensil 12 is larger than the movement of pivoting armature 21. Similar considerations apply when solenoid 15 is excited and causes pen arm 11 to move to position 31. In this manner, three stable positions of the writing utensil can be obtained.

In the preferred version of the recording device, the pen arm 11 is straight and positioned parallel with the edges of solenoids 14 and 15 in its neutral position.

This, however, is not mandatory. Pen arm 11 can also be angled and/or shaft 13 can be displaced with regard to the main symmetry plane of gap 16.

If the deflection of the writing utensil is to be larger on one side than on the other, this requirement can simply be fulfilled by laterally displacing tabs 23 of pivoting armature 21 along the upper and lower armature edges away from the center.

The advantage of this device lies in the fact that an unambiguous central position can be obtained without necessitating critically matched forces of springs 22 and 22'. Furthermore, the device can be of compact construction because the movable pivoting armature 21 adapts to the positions of solenoids 14 and 15. These solenoids can therefore be assembled in an axially opposed manner and small deviations from the axial position are not critical. Due to the location of opening 24 in pen arm 11 with respect to the writing utensil and bearing 13, the actual deflection of the writing utensil when solenoids 14 and 15 are excited is freely selectable. Thus, the device is very simple to manufacture and requires no adjustment work.

In the typical example according to FIGS. 2 and 3, the spring force is exerted by two spiral springs 22 and 22'. However, it is possible to exert these forces by springs assembled at other locations. Thus, a spiral spring can also be attached to tab 23 of pivoting armature 21 on one end and to pen arm 11 on the other end. This spiral spring when tensioned would attempt to rotate the pivoting armature with regard to the pen arm again achieving contact of the pivoting armature 21 at abutments 25 and 26.

The device is explained in the context of an application as an auxiliary recording device of a strip recorder. However, this does not preclude other applications. The device has general applicability for display units, electromechanical control systems and similar equipment.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. Device for positioning a unilaterally pivoted lever arm in three different stable positions with two solenoids characterized by the facts that lever arm (11) is rigidly connected in a forked fashion to a second parallel arm (10), that a shaft (13) perpendicular to the two arms (10,11) provides the pivoting axis, that each arm (10,11) possesses an opening (24) at equal distances from shaft (13), that a plate-shaped pivoting armature (21) is suspended with tabs (23) in these openings (24) while positioned in a gap (16) between two axially opposed, individually switched solenoids (14,15), each having a contact area and diagonally opposing abutments (25,26) for pivoting armature (21), and that at least one spring (22) is provided to press pivoting armature (21) against the two abutments (25,26) in such a manner that when in the neutral position the pivoting armature (21) will be at rest diagonal in the gap (16) between the two solenoids (14,15).

2. Device according to patent claim 1, characterized by the fact that two tension springs are provided, both attached at one side to one of the edges of the pivoting armature and at the other side to the lateral sides of the solenoids limited by the abutments.

3. Device according to patent claim 1, characterized by the fact that a pretensioned spring is attached between one of the two tabs of the pivoting armature and the lever arm with a tendency to rotate the pivoting armature in one direction with respect to the lever arm.

4. Device according to patent claim 1 characterized by the fact that the tabs are in the centers of the edges of the pivoting armature in which the tabs are integrated.

5. Device according to patent claim 1 characterized by the fact that the tabs are not in the centers of the edges of the pivoting armature in which the tabs are integrated.

6. Use of the device according to patent claim 1 in a recording unit characterized by the fact that lever arm (11) carries a spring-loaded writing utensil (12) at the end opposite shaft (13) in order to draw a continuous trace with three distinctly different deflections (5,6, 7) on a moving recording strip.

* * * * *